United States Patent [19]
Dibiasi

[11] 3,856,747
[45] Dec. 24, 2974

[54] PROGRAMMED DEGRADATION OF POLYOLEFINS

[75] Inventor: D. J. Dibiasi, South Plainfield, N.J.

[73] Assignee: Mobil Oil Corporation, New York, N.Y.

[22] Filed: Aug. 7, 1972

[21] Appl. No.: 278,671

[52] U.S. Cl...... 260/45.7 P, 206/46 P, 260/45.85 S, 260/45.85 E, 260/45.95, 260/93.7, 260/94.9 GC, 260/96 D, 260/DIG. 43
[51] Int. Cl............................................. C08d 11/04
[58] Field of Search.. 260/DIG. 43, 94.9 GC, 45.95, 260/45.7 P, 45.85 S, 45.85 E, 96 D, 93.7; 206/46 PV

[56] References Cited
UNITED STATES PATENTS
3,349,018  10/1967  Potts............................ 260/DIG. 43
3,454,510  7/1969  Newland et al................... 260/23 H Primary Examiner—Melvyn I. Marquis
Attorney, Agent, or Firm—Andrew L. Gaboriault; Mitchell G. Condos; Howard M. Flournoy

[57]  ABSTRACT

A method for programmed degradation of a polyolefin resin, containing a pro-degradant or a polyolefin resin containing a pro-degradant and a minor amount of a stabilizer incorporated therein during processing, by maintaining the resin in the presence of an atmosphere having a stabilizer in vaporized form, and a product comprising a polyolefin article (e.g., film), containing a pro-degradant or containing a pro-degradant and a minor amount of a stabilizer incorporated therein, in an enclosed atmosphere having in vaporized form a stabilizing agent whereby while exposed to said atmosphere the article containing the pro-degradant is inhibited against degradation in a programmed manner.

13 Claims, No Drawings

PROGRAMMED DEGRADATION OF POLYOLEFINS

BACKGROUND OF THE INVENTION

1. Field of the Invention

This invention is directed to a method of substantially preventing or inhibiting, in a programmed manner, the degradation of polyolefin resins, polyolefin articles such as film made therefrom, containing pro-degradants or containing pro-degradants and a minor amount of a stabilizer therein.

This invention also provides, in a specific embodiment, a package containing a polyolefin article (e.g., film) as defined above whereby said article is in the presence of an atmosphere of a volatile stabilizer which substantially inhibits or prevents degradation of said polyolefin while within the package in a programmed manner.

2. Description of the Prior Art

Generally speaking, the prior art has resorted to blending substantial quantities of anti-oxidant stabilizers directly into the resin to affect programmed stability and degradation of the resin. When such quantities of the stabilizers are not blended directly into the resin during manufacture, the resin may prematurely deteriorate within a relatively short time when exposed to elevated temperatures, as for example, which may be encountered in warehousing. Such temperatures may vary, for example, from about normal room temperature or lower to about 130° – 160°F depending on locality. Upon removal of the article (as for example a polyolefin bag or polyolefin film) from the package for its intended use the article is subject to the degradability effect imparted by the pro-degradant and even if the article contains a minor amount of an oxidation stabilizer its effect is relatively short-lived and the article is then subject to said degradability effect. This minor amount of stabilizer, although usually insufficient to protect the polyolefin against degradation for prolonged periods under the above described conditions, is generally sufficient to inhibit oxidation-induction during manufacture of the polyolefin articles from a melt of a normally solid polyolefin. Depending upon the quantity of such stabilizer resins selected from polyolefin resins containing a pro-degradant and polyolefin resins containing a pro-degradant and a minor amount of a stabilizer incorporated therein. Therefore, applicants may advantageously provide polyolefin articles, e.g., films, without incorporating any stabilizer therein or may provide such articles with only minor amounts of stabilizing agents.

DESCRIPTION OF SPECIFIC EMBODIMENTS

This invention provides methods whereby sufficient amounts of stabilizer are present as a separate entity, and when in vaporized form inhibit degradation of polyolefin pro-degradant containing articles, as defined above, in a closed atmosphere prior to their intended use, thereby controlling in a programmed manner the period of time required for them to degrade or substantially deteriorate.

Non-limiting examples of polyolefins for use in practicing this invention include: the normally solid homopolymers and copolymers of $C_2$ and higher olefins; with non-limiting examples including polyethylene, polypropylene, polybutene, copolymers derived from a mixture of olefins such as, ethylene, propylene, butene-1, pentene-1, etc. Especially advantageous polyolefins are polyethylene, polypropylene, and polybutylene.

A variety of materials, generally those known to the art as anti-oxidants (hereinafter referred to as stabilizers) are adaptable for use as the vaporizable stabilizer for practice of this invention.

Non-limiting examples of such vaporizable stabilizers include:

1. Di-substituted cresols, e.g., 2,6-di-tert-butyl-p-cresol (Ionol).
2. Tris-nonylphenyl phosphite (Polygard)
3. Dithiocarbamates (e.g. Butyl Zymate, zinc dithiocarbamate)
4. Dilaurylthiodipropionate thiodipropionates (e.g., DLTDP, dilauryl-thiodipropionate)

Non-limiting examples of stabilizers suitable for incorporation directly into the polyolefin article according to the invention include tetrakis [methylene-(3,5-di-tert-butyl-4-hydroxyhydrocinnamate)]methane and 1,1,3-tris-(2'-methyl-4'-hydroxy-5'-tert-butyl phenyl) butane and others.

Pro-degradants known to the art for enhancing degradation of polyolefins may be used in the practice of this invention. Preferred are metal pro-degradants, non-limiting examples of which include iron, cobalt, nickel and manganese and, more specifically metal salts of such metals.

This combination of a pro-degradant and a vaporizable stabilizer allows the polyolefin film to remain stable for relatively longer periods when maintained in the vaporizable atmosphere created by said stabilizers inside a closed environment, e.g., such as a closed package, at elevated temperatures.

Various means may be used to maintain a vaporizable atmosphere. The polyolefin articles may, normally under certain warehouse conditions, be exposed to temperatures that will vaporize said stabilizer. The stabilizer can be present in various physical forms in a closed package containing the article, and as long as it is in the package and vaporizes, the polyolefin (e.g., film) will be inhibited in a programmed manner against degradation. For example, the stabilizer could be present inside a carton in the form of a pouch-like container, painted as a solution onto the inner surface of a package crate, etc., impregnated in articles such as twist ties often contained in cartons of plastic (e.g., polyolefin bags) as closure means for the bags, etc. Thus any practical means of maintaining a vaporizable stabilizer atmosphere in a closed environment is within the scope of this invention.

Applicant has therefore discovered that when polyolefin articles containing a pro-degradant or a pro-degradant and a minor amount of a stabilizer are maintained in the environment of a vaporizable stabilizer, degradation is inhibited and/or substantially prevented until the film is removed from the stabilizing environment. Accordingly, polyolefin films, for example, may be stored for significant periods of time without the film degrading substantially and yet have the film undergo desired degradation when removed from the inhibiting atmosphere of the stabilizer; thereby resulting in programming their degradation. However, depending on the intended use of the article and/or as an additional means of programming degradation and protecting the product from oxidation during manufacture a minor amount of stabilizer may be blended directly into the article. Advantageously, the presence of a vaporizable stabilizer in the package allows the use of minimized small amounts of a stabilizer incorporated in the resin itself, e.g., from about 50 parts/million to about 500 parts/million based on the weight of the polyolefin when a stabilizer is also present in the resin.

The amount of stabilizer which provides, in vaporized form, the inhibiting atmosphere and the amount of pro-degradant in the polyolefin article will, of course, vary depending on the particular circumstances. As an embodiment, the amount of pro-degradant usually effective for enhancing degradation of polyolefins may be in the range of from about 50 parts/million to 3,000 parts/million of the pro-degradant based on the weight of the polyolefin. Usually the pro-degradants are metal salts, examples of which include cobalt napthenate, manganese dioxide and others. Any convenient material which can retain, for a desired predetermined time, the vaporized stabilizer containing atmosphere may be used for packaging the polyolefin articles according to the invention. Thus plastic cartons, cardboard boxes and the like may be used. For example, as an embodiment about 0.01 to about 1 gram of vaporizable stabilizer has been found to be generally effective in a sealed cardboard carton 9 × 5½ × 1½ inches. Various types and shapes of packages and the like, may be used to store or house the polyolefins.

The following detailed examples are intended as illustrations rather than limitations on the scope of this invention so as to provide a better understanding of the nature, objects and advantages of the invention.

EXAMPLE I

This example illustrates the volatility of representative volatilizable stabilizers disclosed hereinabove. In the following Table, the weight loss of equal amounts of Polygard and DLTDP at 70°C in an air atmosphere versus time is demonstrated.

Table

Isothermal weight loss of the stabilizer at 70°C in an air atmosphere (Gravity Convection Oven)

| Stabilizer | Weight Loss % | Time (Days) |
|---|---|---|
| Polygard | 8 | 5 |
|  | 23 | 10 |
|  | 29 | 20 |
|  | 33 | 30 |
|  | 36 | 40 |
| DLTDP | 2.9 | 5 |
|  | 3.2 | 10 |
|  | 3.4 | 20 |
|  | 3.5 | 30 |
|  | 3.6 | 40 |

The weight loss vs. time indicates that a sufficient amount of such stabilizer is made available to provide a stabilizing atmosphere in excess of 3 months at 70°C when the stabilizer is in an enclosed space.

EXAMPLE II

Storage Stability

This example illustrates the storage or warehouse stability of the polyolefin articles under temperature and atmospheric conditions frequently occurring during warehousing of these articles.

In each of twelve cardboard cartons (9 by 5½ by 1½ inches) were placed six LDPE[a] trash can liner bags (6 in. by 3 ft. by 1 in.) and a separate packet containing the volatizable stabilizer in powdered form in porous "kim-wipe" tissues folded to the form of a "tea-bag" or "pouch-like bag". These cartons were then sealed and placed in a larger cardboard container (9½ by 9½ by 12 inches).

[a] LDPE (low density polyethylene, 1.5 – 2.5 melt index density 0.921 – 0.925 g/cc)

The latter carton was then placed in a forced air oven at 160°F to simulate said warehouse conditions.

Four such runs were made. In runs 1 and 2, the liner bags were made from LDPE film extruded from a melt of the LDPE containing 150 parts/million of tetrakis [methylene-(3,5-di-tert-butyl-4-hydroxy-hydrocinnamate)] methane as a stabilizer and 200 parts/million of cobalt napthenate as the pro-degradant, based on the weight of the LDPE. Run 3 used the same type liner bags, except that they contained only 100 parts/million of the cobalt napthenate. Run 4 also used the same type liner bags except that the stabilizer content comprised 300 parts/million of [1,1,-3-tert-(2'-methyl-4'-hydroxy-5'-tert-butylphenyl)butane].

In run 1, each small carton contained, 1.0 gm. DLTDP; in run 2, 0.1 gm. Polygard; in run 3, 0.5 gm. Polygard and in run 4, 0.1 gm. Polygard in the heretofore referred to separate packet.

For control purposes four similar runs were made in cartons without the vaporizable stabilizers (Polygard, DLTDP).

The resulting data, as set forth in the following Table, shows that the LDPE liner bags in the cartons containing Polygard or DLTDP suffered essentially no degradation after 17 days at 160°F. The polyethylene articles compared in the similar experiments without the Polygard or DLTDP substantially deteriorated after only 12 days.

TABLE

CONDITIONS

| RUN | 12 DAYS at 160°F REMARKS Control (No vaporizable stabilizer as separate entity) | 17 DAYS at 160°F REMARKS (In presence of vaporizable stabilizer as separate entity) |
|---|---|---|
| 1 | Degraded-strong odor, liners* fused, cheesy | Good tear, good seals No odor (1.0 gms DLTDP) |
| 2 | Degraded-strong odor, liners fused, cheesy | Good tear, good seals No odor (0.1 gm Polygard) |
| 3 | Degraded-strong odor, liners fused, cheesy | Good tear, good seals No odor (0.5 gm Polygard) |
| 4 | Degraded-strong odor, liners fused, cheesy | Good tear, good seals No odor (1.0 gm Polygard) |

* LDPE (low density polyethylene, 1.5 – 2.50 melt index, density .921 – .925

The foregoing examples clearly demonstrate that these compositions and their method of producing a vaporizable atmosphere are highly effective in inhibiting and/or programming the degradation of polyolefin resins as disclosed hereinabove. Other disclosed embodiments although not exemplified give equivalent though not identical results.

We claim:

1. A method of inhibiting the degradation of polyolefin resins, said resins having incorporated therein from about 50 parts/million to about 3,000 parts/million, based on the weight of the polyolefin, of a pro-degradant selected from the group consisting of manganese dioxide and cobalt naphthenate and having incorporated directly into the polyolefin resins from about 50 parts/million to about 500 parts/million based on the weight of the polyolefin, of a vaporizable stabilizer selected from the group consisting of tetrakis [methylene-(3,5-di-tert-butyl-4-hydroxyhydrocinnamate)] methane and 1,1,3-tris-(2'-methyl-4'-hydroxy-5'-tert-butyl phenyl) butane by maintaining said resins in a closed atmosphere and/or having therein as a separate entity a minor stabilizing amount of a vaporizable stabilizer selected from the group consisting of 2,6-di-tert-butyl-p-cresol, tris-nonylphenyl phosphite, zinc dibutyldithiocarbamate and dilaurylthiodipropionate.

2. The method of claim 1 wherein the polyolefin is selected from the group consisting of polyethylene, polypropylene, polybutylene and copolymers derived from a mixture of olefins selcted from the group consisting of ethylene, propylene, butene-1 and pentene-1.

3. The method of claim 2 wherein the polyolefin is polyethylene.

4. A polyolefin article comprising a polyolefin resin and vaporizable stabilizers as defined in claim 1.

5. The article of claim 4 wherein the polyolefin is selected from the group consisting of polyethylene, polypropylene, polybutylene and copolymers derived from a mixture of olefins selected from the group consisting of ethylene, propylene, butene-1 and pentene-1.

6. The article of claim 4 wherein said article is a polyethylene film.

7. A closed package containing a polyolefin article as defined in claim 4 wherein said vaporizable stabalizing agent is in vaporized form.

8. The package of claim 7 wherein the vaporizable stabilizing agent as a separate entity is painted on the inner surface of the package.

9. The package of claim 7 wherein the vaporizable stabilizing agent is present inside the package in a pouch-like container.

10. The package of claim 7 containing polyolefin bags in said closed atmosphere wherein the vaporizable stabilizing agent is impregnated in twist ties as a closure means for such bags.

11. The method of claim 1 wherein the vaporizable stabilizers as described therein are incorporated directly into the polyolefin resins and are also present in said closed atmosphere as a separate entity.

12. The article of claim 4 wherein the vaporizable stabilizers as described therein are incorporated directly into the polyolefin resins and are also present in said closed atmosphere as a separate entity.

13. The package of claim 7 wherein the vaporizable stabilizers as described therein are incorporated directly into the polyolefin resins and are also present in said closed atmosphere as a separate entity.

* * * * *